Figure 1:
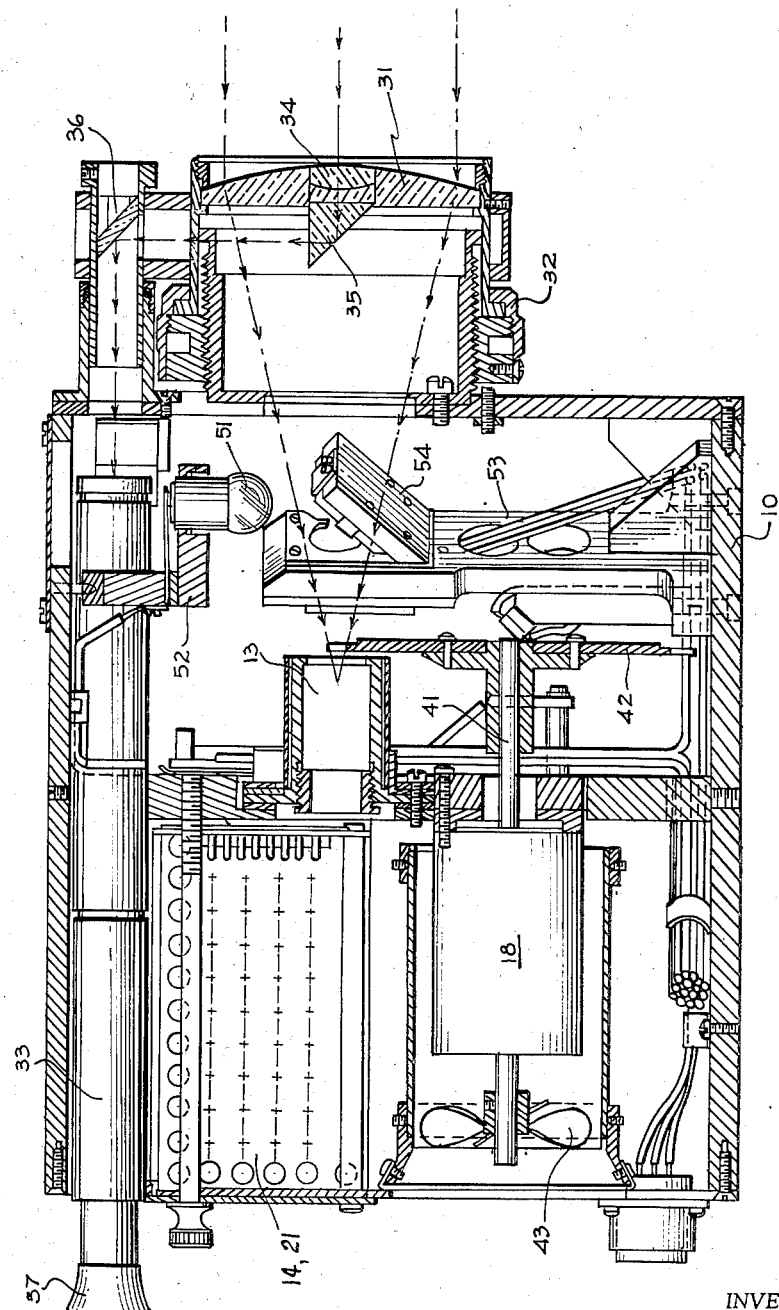

INVENTORS
Arthur E. Goldberg
David L. Fain
BY Dunn, McDougall, Williams & Hersh
Attorneys INVENTORS
Arthur E. Goldberg
David L. Fain
BY
Attorneys

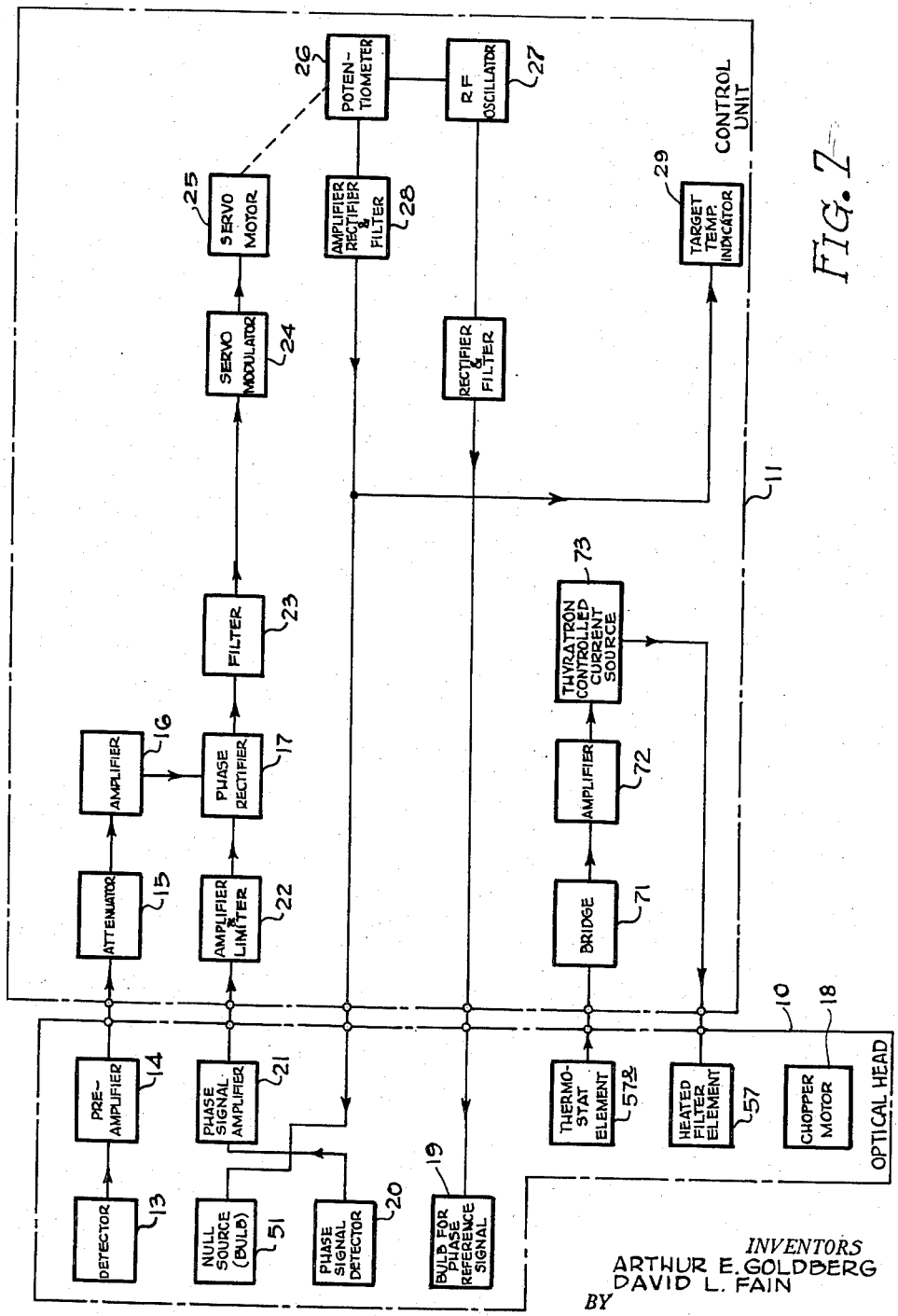

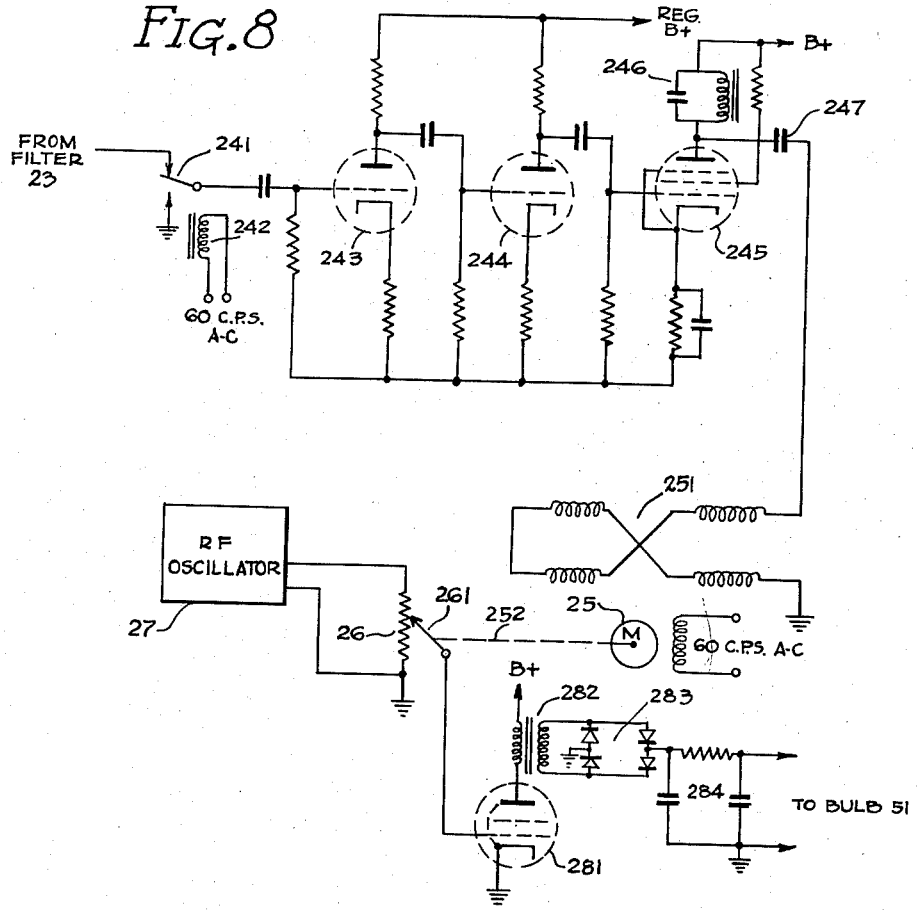

ns">United States Patent Office 2,968,946
Patented Jan. 24, 1961

2,968,946

RADIATION PYROMETER

Arthur E. Goldberg, Evanston, and David L. Fain, Lincolnwood, Ill., assignors, by mesne assignments, to Comptometer Corporation, Chicago, Ill., a corporation of Illinois Filed Nov. 12, 1958, Ser. No. 773,509

15 Claims. (Cl. 73—355)

This invention relates to radiation pyrometers and is specifically directed to an automatic pyrometer of the null-seeking type possessing a number of important advantages over the prior art.

Numerous variants of the null-seeking principle have been used in automatic pyrometers, and the principles of the present invention are applicable to various types of such instruments. The particular embodiment of our invention herein to be described is a pyrometer of the A.-C. modulated type. In its simplest form, such an instrument may consist of a radiation detector, an optical system for focusing radiation from the target object onto the detector, a local radiation source of controllable temperature, and a means for exposing the detector alternately to radiation from the target object and to radiation from the local source, commonly called the "null source." Unless the response of the detector to radiation from the two sources is equal, the electrical output of the detector will contain an A.-C. component whose fundamental frequency will be equal to the frequency at which the detector is "switched" from one source to the other. If the geometry of the system and the sensitivity of the detector are fixed, the amplitude of this A.-C. component of output signal from the detector will depend solely on the relative radiation intensities of the target object and the null source. If the radiation intensity from the null source is adjusted to equal exactly the intensity of radiation being received from the target object, the A.-C. component of output signal from the radiation detector will disappear. If both the target object and the local null source are perfect black bodies, the target temperature may be determined by measuring the temperature of the local null source, and the temperature indication thus obtained is independent of the detector sensitivity.

Pyrometers employing this "null" principle are in common usage. The primary disadvantage of prior-art systems of this type arises from the fact that standard black-body radiators possess large thermal inertia and, as a result, a long period of time is required to vary their temperatures.

In the present invention, an automatic null-seeking pyrometer has been provided in which an incandescent metal filament of negligible mass is employed as the null source. In our apparatus, as a result, the time required to adjust the null source to balance the radiation from the target body is of the order of one second or less, as compared to many minutes in comparable prior-art systems. This permits continuous monitoring of a target whose temperature is varying rapidly and permits variations in target temperature to be faithfully recorded on standard high-speed strip chart recorders.

While attempts have been made in the prior art to devise null-seeking pyrometers using incandescent filaments as null sources, such efforts have not led to satisfactory results, except in special applications. Such devices, where successfully used, have been limited to measuring visible radiation from target bodies and have been unable to provide high-speed monitoring of infrared radiation.

An important novel feature and object of the present invention is to provide a null-seeking pyrometer in which infra-red energy at long wavelengths is nulled or balanced by radiant energy in the visible and near infrared spectrum. The achievement of this object is of the greatest practical importance, because, as heretofore noted, black-body radiators producing long-wavelength infra-red energy characteristically have large thermal inertia and hence cannot be made to vary rapidly in temperature.

In achieving the important object just mentioned, our present invention embodies the further advantage and object of achieving a null in detector output signal by balancing photon flux against equal photon flux at different wavelengths, rather than by balancing temperature against temperature as in most prior-art pyrometers.

In the present invention, using an incandescent-filament bulb as the null source, we provide means for eliminating from the null-source radiation the infra-red components of energy radiated from the bulb envelope, thus confining the effective radiation from the null source to that emanating directly from the incandescent filament itself. This is an object of great practical importance because the aforementioned envelope radiation is characterized by high thermal inertia and, if permitted to affect null determination, will prevent high-speed response.

Still another important feature and object of our invention is to provide, in a null-seeking pyrometer, means to prevent the radiation detector from responding to varying ambient radiation which would otherwise introduce error into the temperature measurements.

A further valuable object and advantage of the present invention consists in achieving a reasonably linear relationship between the voltage applied to the incandescent-filament null source and the target temperature over a wide range, extending from just above ambient temperature to a target temperature of over 700° C. This advantage, which to our knowledge has never been achieved in the prior art, permits the use of direct temperature-indicating scales and greatly facilitates display of temperature data on an indicating meter, recorder, or oscilloscope.

Still another object of the present invention is the provision of an automatic null-seeking pyrometer in which the accuracy of the temperature measurements does not depend on accurately balancing the characteristics of circuit components and in which the accuracy of measurement does not depend on the sensitivity of the radiation-detecting element. In our invention, the only circuit component requiring stability over a long time period is the incandescent-filament bulb used as a null source. In our invention we are able to employ as null sources standard incandescent light bulbs, and we have found such standard bulbs to have excellent stability over many months of continuous operation, with accurately reproducible results over such extended periods.

Other objects and advantages of our invention will appear from the following detailed description of a typical embodiment thereof.

Figure 2:
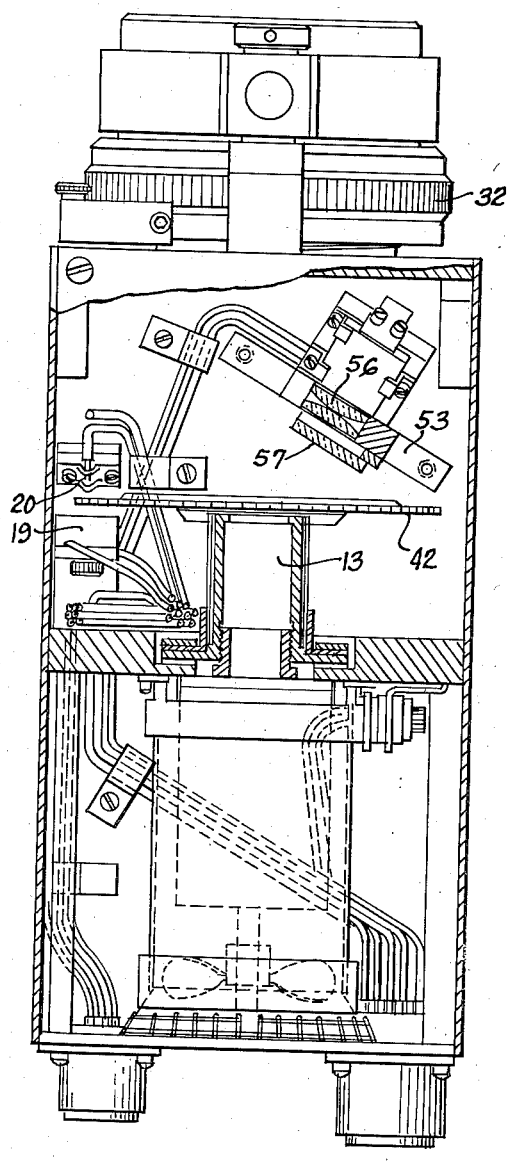
Figure 3:
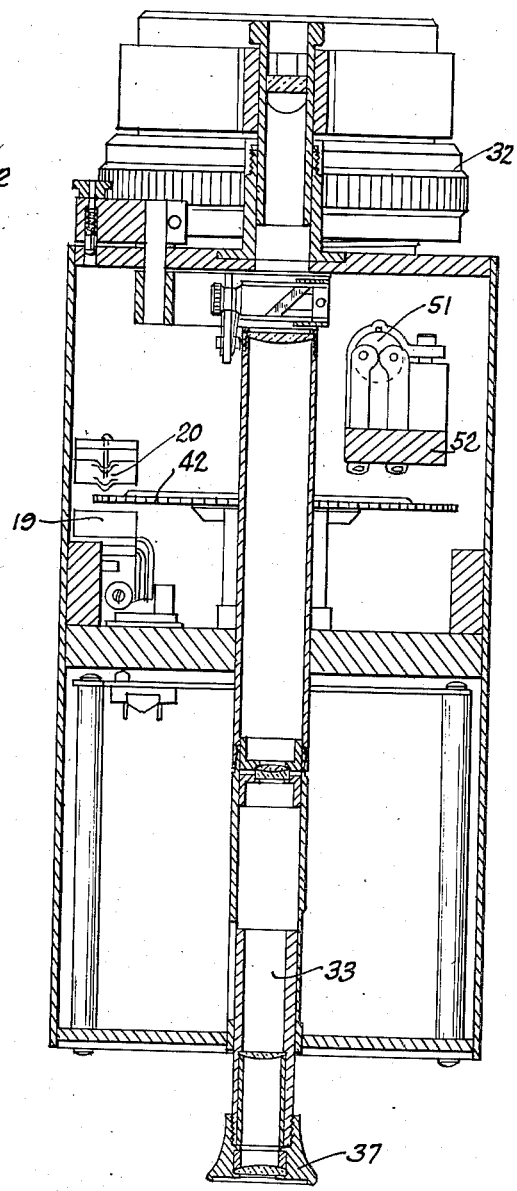
Figure 4:
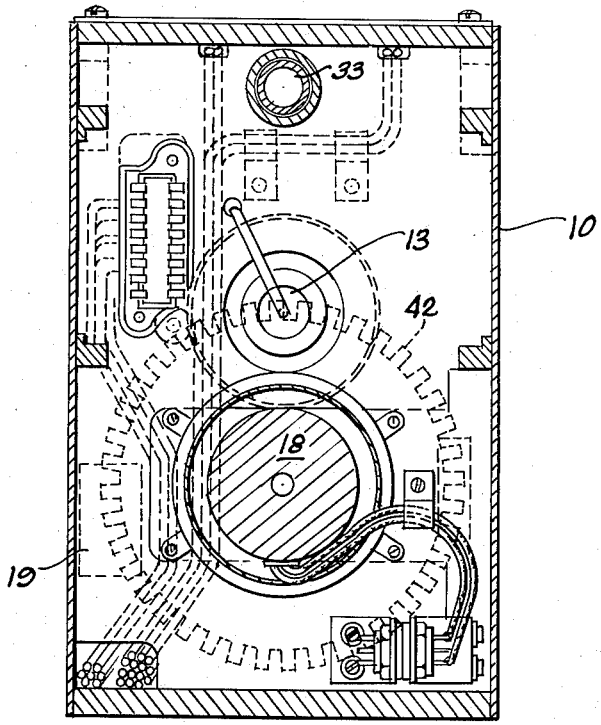
Figures 5, 6:
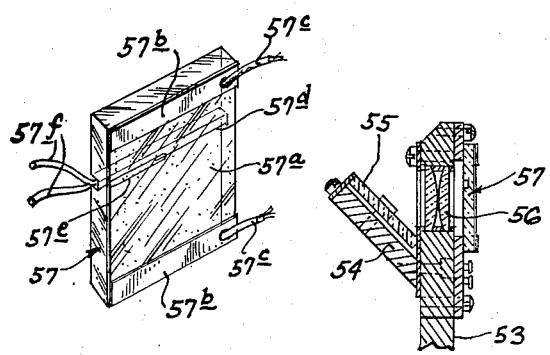

In the appended drawing, Figure 1 is a side view, mostly in section, of a typical pyrometer apparatus embodying the principles of our invention. Fig. 2 is a view mostly in section showing the apparatus of Fig. 1 as viewed from above with the upper layer of parts removed to bring out the structural relationships of the under-lying components. Fig. 3 is a view similar to Fig. 2, in transverse section, but with the section line taken higher on the housing so as to bring out the relative orientation of the top-layer components. Fig. 4 is a sectional view showing the Fig. 1 apparatus as viewed from the rear of the intermediate bulkhead. Fig. 5 is a perspective detail view of a heated infra-red filter which forms an important part of the invention. Fig. 6 is a detailed sectional view showing the structure of certain important parts of the optical system associated with the null source. Fig. 7 is a block diagram showing the over-all arrangement of circuitry in the Fig. 1 embodiment of the invention. Fig. 8 is a schematic diagram showing suitable circuitry for use in certain of the blocks shown in Fig. 7.

As may be noted by reference to Fig. 7, we have found it convenient to mount the optical components of our pyrometer, together with some of the electrical elements, in a so-called "optical head" 10. The other electrical components and such conventional elements as power supplies (not shown) may best be separately housed in a control unit 11, indicated by a dotted enclosure on Fig. 7. Since the structural characteristics of the control unit do not per se form any part of this invention, our description of the structural aspects of our invention will all relate to the optical head 10, which is generally portrayed in Figs. 1–4.

At the forward end of the optical head 10 we provide an infra-red lens 31, suitably mounted in a conventional focusing mechanism 32, by means of which the lens 31 may be manually advanced and retracted through a predetermined range of movement to focus the infra-red rays from the target to be studied onto the surfaces of infra-red detector element 13.

Infra-red focusing lenses suitable for use as lens 31 are well known in the art of infra-red detection and measurement. A suitable lens may be made of arsenic trisulphide, which will pass and successfully focus infra-red radiation out to a wavelength of 13 microns or thereabouts. Other suitable lens materials are well known to the art. Further, reflective optics may be used, as skilled readers will realize.

A typical sensitive element suitable for use as detector 13 may be an intermetallic crystal such as an indium antimonide crystal of the sort marketed by the assignee of this application under the trademark "Thermotek." Such a crystal utilizes the photoelectromagnetic effect and is characterized by low electrical impedance. When connected to a low-impedance load, a crystal of that type will produce a current output which varies in accordance with the flux intensity of the radiation impinging upon it. A typical indium antimonide crystal has a spectral response characteristic which is substantially flat from the visible spectrum out to a wavelength of about 5 microns, and at longer wavelengths the relative response drops off quite sharply, the half-power point occurring at about 6.9 microns.

Many other types of infra-red sensitive detector elements known to the art can be successfully used in a detector of the type herein described. Persons skilled in the art will of course understand that any given type of detector should be associated with circuitry appropriate to its own impedance characteristics; i.e., a detector characterized by high electrical impedance should be arranged so as to feed into a high-impedance load.

To facilitate the aiming and focusing of our pyrometer, we provide an optical telescope 33, of which the objective lens is a glass lens 34 inserted in the center of the infra-red lens 31. Visual light passing through the glass lens 34 is reflected upward off a prism 35 onto a diagonal mirror 36 and is transmitted thence through the telescope 33 to the eye piece 37. The focusing mechanism 32 adjusts the focusing of the telescope 33 simultaneously with the focusing of infra-red lens 31, and the optical characteristics of the glass lenses used in the telescope 33 are so chosen as to make the optical image of the target come into sharp focus in the eye piece 37 at the same position of focusing mechanism 32 at which the infra-red energy passing through lens 31 is focused thereby on infra-red detector 13. This arrangement, which is conventional in pyrometers, makes it possible to focus the infra-red rays simply by bringing the image of the target into sharp optical focus at the eye piece 37.

Positioned below the detector element 13 is a shaft 41 to which is keyed a chopper wheel 42, the rim of which is notched to define a large number of peripheral slots of uniform width and an equal number of uniform peripheral projections, the width of the slots and projections being equal. The relative positions of detector element 13 and chopper wheel 42 are such that, as chopper wheel 42 rotates, the alternate slots and projections around its rim intercept the focused infra-red beam impinging on the detector 13 from the lens 31. As a result, when chopper wheel 42 rotates, infra-red energy from the lens 31 is able to strike the detector 13 when one of the peripheral slots is passing in front of it and is cut off whenever one of the peripheral projections of wheel 42 is blocking the path of the beam.

In the embodiment shown, the chopper wheel 42 is provided with forty slots and an equal number of projections, but this number may be varied as a matter of design convenience.

In operation, the chopper wheel 42 is rotated rapidly by an electric motor 18 which turns shaft 41. If desired, a ventilating fan 43 may be keyed to the opposite end of shaft 41, as shown in Fig. 1.

In a typical embodiment of the invention, the motor 18 may turn chopper wheel 42 at a speed of 3,600 r.p.m., which provides a chopping frequency or interruption rate of 2,400 cycles per second. That is, the peripheral slots and projections on the wheel 42 cut off the path of the infra-red beam between lens 31 and detector 13 at the rate of 2,400 times per second. It should be understood, of course, that this is merely a typical operating frequency.

The local null source and its associated optical apparatus are mounted in the housing 10 in front of chopper wheel 42 but displaced to one side of the mid-line of the housing, to avoid interference with passage of the infra-red beam from lens 31 to detector 13. The null source itself is in the illustrated embodiment a conventional tungsten-filament light bulb 51, mounted on a bracket 52 which depends from the top cover of housing 10. Below the bulb 51 is a vertical standard 53, mounted on the floor of housing 10, which carries the optical apparatus by means of which radiation from bulb 51 is transmitted to the detector 13. This structure is shown in Figs. 1 and 2, and is brought out in greater detail in Fig. 6.

The standard 53 has a diagonal extension 54 immediately below the bulb 51 which carries a front-silvered mirror 55, operative to reflect radiant energy from the bulb 51 toward a glass lens assembly 56 which is carried by the standard 53. On the opposite side of the lens system 56 from the mirror 55 is a glass filter plate 57 which constitutes an important part of the present invention and which will be described in greater detail in a later paragraph hereof.

The standard 53 is positioned relative to the chopper wheel 42 and the detector element 13 so as to define a path for radiant energy from the filament of bulb 51 to the surface of mirror 55 and thence through the focusing lens 56 and the filter plate 57 onto the detector element 13. The geometry of the various elements is so arranged that a slot in the chopper wheel 42 provides passage for radiant energy from the bulb 51 onto the detector element 13 whenever a peripheral projection on the wheel 42 is blocking the target-signal infra-red beam from access to the detector 13. Conversely, whenever one of the peripheral slots in the wheel 42 is positioned to admit the target-signal infra-red beam to the detector 13, a peripheral projection of the chopper wheel shuts off from the detector 13 the radiant energy originating at the filament of bulb 51. Thus, when the chopper wheel 42 is rotated, the detector 13 is alternately exposed to radiant energy from the target signal, reaching it through lens 31, and to radiant energy from the null source 51, reaching it via the mirror 55, the focusing lens 56, and the filter plate 57.

The filter plate 57 is made of glass having the property of absorbing and hence filtering out long-wave infra-red radiation impinging upon it. Glass is commercially available which has a spectral characteristic cutting off at about 3 microns wavelength. Any other material of suitable physical properties having roughly the same spectral characteristics may be used for filter plate 57.

In Fig. 5, filter plate 57 is shown in perspective. The front surface of plate 57, as therein shown, is coated with a thin layer of transparent electrically conductive material 57a, such as the coating material commercially known as NESA, and on opposite ends of that surface a pair of suitable electrodes 57b are provided to afford a convenient means of electrical connection to the conductive surface 57a. Wires 57c run from the electrodes 57b to the external circuitry which will be hereinafter described in connection with Fig. 7.

The electrodes 57b may be formed in any desired manner which will afford good electrical contact with the conductive surface 57a and provide sufficient mechanical strength to hold the connecting wires 57c.

On the face of filter plate 57 opposite the conductive surface 57a a transverse slot 57d is cut, and embedded therein is a temperature-responsive element 57e, which may be a thermistor or similar electrical device having characteristics whch change in response to temperature. Temperature-responsive element 57e is also provided with a pair of electrical leads 57f for connecting the element to the external circuitry presently to be described.

Disposed behind the chopper wheel 42 alongside the detector 13 is a light source 19, which may be a conventional tungsten-filament incandescent bulb, preferably enclosed in a housing as shown having a small aperture on its front face permitting light from the bulb 19 to strike the rear side of chopper wheel 42 near its periphery. On the other side of the chopper wheel 42 and disposed directly in front of the bulb 19 is a light-responsive element 20, which may be a simple photocell such as a germanium diode. Light source 19 and photocell 20 are positioned relative to the rim of chopper wheel 42 so as to permit light from source 19 to strike the photocell 20 when one of the peripheral slots is passing between elements 19 and 20 and to cut off the passage of light from source 19 to photocell 20 when one of the peripheral projections of chopper wheel 42 is interposed therebetween. With this arrangement, it will be seen that the electrical output of photocell 20 will provide a varying signal having the same fundamental frequency as the information-signal output of detector 13. This auxiliary signal is used in our pyrometer as a phase-reference signal, for a purpose presently to be described.

We shall now discuss, in connection with Fig. 7, the general nature of the electrical circuitry which is employed in connection with the structural elements of our pyrometer which have been described.

The output of the detector 13 is fed to a preamplifier 14 having input characteristics suitably chosen for use with the particular infra-red detector being used. The output signal from preamplifier 14 is fed through an attenuator 15 and thence into a high-level amplifier 16. The output from amplifier 16, now at a relatively high power level, is applied to a phase-sensitive rectifier 17.

The phase-sensitive rectifier 17 is of the well-known type wherein a D.-C. output voltage is provided which is proportional in magnitude to the A.-C. signal fed to it and is negative or positive in polarity according to whether the applied signal is in phase identity or phase opposition to a reference signal.

In this case, the reference signal is derived from the photocell 20, which, as mentioned, provides a constant-phase signal produced by the chopper wheel's periodic interruption of light from the bulb 19. This signal is amplified by phase-signal amplifier 21, is further amplified and limited by an amplifier 22, and is applied to the phase-sensitive rectifier 17 as a reference signal.

The D.-C. output voltage of the phase rectifier 17 is filtered by a conventional smoothing filter 23 and fed to a servo modulator 24, wherein it is inverted to A.-C. at a suitable frequency, such as 60 cycles per second, for control of a servo motor 25. (A schematic diagram of a suitable servo modulator 24 is shown in Fig. 8, presently to be described.)

Servo motor 25 is mechanically coupled to the movable arm of a potentiometer 26.

Potentiometer 26 is provided with high-frequency current at some suitable frequency, such as 20 k.c./s., from an oscillator 27. The magnitude of the R.-F. voltage present at the output of potentiometer 26 is varied as the position of the potentiometer arm is shifted by servo motor 25.

The output of potentiometer 26, taken from its movable arm, is amplified, rectified, and filtered by the circuit elements represented by block 28. The resulting D.-C. voltage is applied to the null source 51 which, as already mentioned, may be a conventional tungsten-filament incandescent bulb. The current flowing through the filament of bulb 51 responsively to the voltage thus applied to it heats the filament and provides the locally generated radiation to which the detector 13 is intermittently exposed by operation of the chapper wheel 42.

The same D.-C. voltage applied to the filament of bulb 51 is also applied to a suitable target-temperature indicator 29, which may be a simple D.-C. voltmeter or, if desired, may be an oscilloscope or a strip recorder, or a combination of such elements.

The remaining circuit elements indicated by blocks in Fig. 7 are used to pass current through the conductive surface 57a on filter plate 57 and to control such current to maintain the temperature of the plate 57 at a constant value slightly above the ambient temperature in the housing 10. This may be accomplished in various conventional ways. The particular means used in the illustrative embodiment of our invention herein described comprises a bridge network 71 which is actuated by the temperature-responsive element 57e already referred to. If the temperature of the filter plate 57 is different from that at which the bridge 71 is balanced, an error signal will appear across the bridge. This signal is amplified in block 72 and used to govern a thyratron-controlled current source 73, which supplies current to the conductive coating 57a via the electrodes 57b and connecting wires 57c.

Thermostatic control mechanisms of this general type are well known in the art, and no detailed description of their structure or manner of operation is necessary, since the particular circuit employed does not of itself form a part of the present invention.

The only portion of the electronic circuitry indicated by the block diagram in Fig. 7 which is sufficiently unconventional to call for detailed discussion is the apparatus by means of which the D.-C. signal from filter 23 is caused to regulate the voltage applied to the null-source bulb 51. While servo mechanisms for performing this operation are known to the art, we have for the sake of complete disclosure shown in Fig. 8 a suitable servo arrangement for the purpose.

The D.-C. voltage from filter 23, which may be either positive or negative with respect to ground, according to whether the photon flux impinging on detector 13 from bulb 51 is greater or less than that impinging on the detector 13 from the target object, is applied to a conventional reed chopper 241, having a magnet coil 242 which is powered by power-line A.-C. current, normally 60 cycles per second.

The output voltage from chopper 241 is essentially a square-wave A.-C. voltage of 60 cycles per second, having amplitude proportional to the value of the D.-C. voltage from filter 23. This A.-C. voltage is applied to a conventional two-stage resistance-coupled amplifier comprising triode tubes 243 and 244. The resulting amplified voltage is fed to the control grid of a power-amplifier tube 245, the plate circuit of which contains a tank circuit 246 which is resonant at the power-line frequency, normally 60 cycles per second. This provides at the plate of tube 245 a substantially sinusoidal voltage at the power-line frequency. This voltage is either substantially 90° leading relative to the power-line current or is substantially 90° lagging relative to the power-line current, depending on the polarity of the D.-C. voltage applied to the input of chopper 241.

The voltage at the plate of tube 245 is applied through a coupling capacitor 247 to the armature windings 251 of servo motor 25, the field winding of which is energized by current from the power line, which acts as a phase reference. The shaft of motor 25 is mechanically coupled through a conventional gear box to the movable arm 261 of the potentiometer 26. This mechanical coupling is indicated on the schematic diagram by the dotted line 252.

The fixed terminals of potentiometer 26 are bridged across the output of R-F oscillator 27, already mentioned. The R-F voltage appearing at arm 261 of potentiometer 26 is applied to the control grid of a power amplifier tube 281, which has connected in its plate circuit a suitable output transformer 282. The R-F voltage appearing across the secondary winding of transformer 282 is rectified by a conventional bridge rectifier 283 and the ripples in the output current are smoothed out by a conventional capacitance-resistance filter 284. The resulting rectified and filtered D.-C. voltage is applied, as indicated in Fig. 8, to the terminals of bulb 51.

As is conventional in servo mechanisms, the voltage output from tube 245 is connected to the armature windings 251 in the manner appropriate to make the system self-balancing. Thus, if the voltage at the output of filter 23 is of the polarity indicating that the filament temperature of bulb 51 is greater than it should be to "null" the radiation from the target source, then the motor 25, responsively to such voltage, will move the potentiometer arm 261 in the direction tending to reduce the voltage applied to the bulb filament, and vice versa.

*Operation*

Null-seeking pyrometers, as already mentioned, are well known to the art. Most prior-art systems, however, have balanced the temperature of a local null source against the temperature of the target source. The system of our invention, by contrast, balances photon flux from the null source against photon flux from the target source. Since the photon flux used in our invention to achieve a null is that which is derived from the filament of bulb 51, it is possible to change the null-source flux very rapidly, since the filament has very small mass and hence very low thermal inertia.

While the filament of an incandescent bulb possesses this desirable characteristic of low thermal inertia, the glass envelope which encloses the filament does not have that property. Such a glass bulb has an appreciable mass and, because glass is a very poor heat conductor, the glass bulb possesses a great deal of thermal inertia. That this is true is apparent from the well-known fact that an incandescent bulb will often remain too hot for manual handling for a substantial period after the filament has been turned off. To achieve the rapid operation desired in an automatic pyrometer, we have therefore provided means, in the form of filter plate 57, to prevent radiation from the glass envelope of bulb 51 from affecting infrared detector 13. To achieve this, we have made use of the fact that the heat radiation from the glass envelope of bulb 51 is characteristically of much longer wavelength than the principal radiation from the incandescent filament of the bulb. The filter plate 57 cuts off radiation of wavelengths beyond about 3 microns and hence absorbs all but a negligible portion of the glass envelope emission. Thus variations in the temperature of the glass envelope of bulb 51 are not sensed by the detector 13 and do not contribute to the null signal. The bulb filament, being much hotter than the envelope, emits radiation having an emission spectrum shifted toward shorter wavelengths, as compared to that of the envelope. The portions of the filament radiation below about 3 microns are transmitted by the filter plate 57 and represent the accurately controlled and rapidly variable null signal.

The filter plate 57 itself emits radiation at wavelengths longer than its own transmission limit. The intensity and spectral distribution of this radiation depends on the filter-plate temperature. This radiation, if permitted to vary during pyrometer operation, will add an unknown and uncontrolled contribution to the null signal which (a) leads to inaccurate measurements and (b) has an undesirably long time constant. In our invention, therefore, we heat the filter plate 57 to a temperature above ambient value and hold it fixed by means of the thermostatic control mechanism heretofore described, comprising heat-sensitive element 57d, the conductive coating 57a, the associated apparatus 71, 72, and 73. While the filter plate 57 does under these conditions radiate long-wavelength infra-red energy, the quantity of this radiation impinging on the detector 13 is constant during pyrometer operation. Thus, while the radiation from the filter plate is a component of the null signal, it merely sets a base level from which the null-seeking mechanism operates.

To initiate operation, the optical head 10 is pointed toward the target whose temperature is to be measured, and the radiation from the target is focused on the detector 13 by means of the focusing mechanism 32, aided by optical focusing via the telescope 33. The chopper wheel 42 is set into rotation, and the detector 13 is accordingly exposed alternately to radiation from the target and from the null-source bulb 51, the switching frequency being dependent on the speed of chopper wheel 42. If the photon flux impinging on the detector 13 from the target differs from that which impinges thereon from the null source, an A.-C. signal, at a fundamental frequency equal to the chopping rate, will appear across the terminals of detector 13. The phase of this A.-C. signal will indicate whether the photon flux from the target is greater or smaller than that from the bulb filament; i.e., the phase of the output signal from detector 13 when the photon flux from the target exceeds that from the bulb filament will be opposite to the phase of the signal obtained when the flux from the target is less than that derived from the bulb filament.

As heretofore mentioned, a phase reference is provided by means of the auxiliary light bulb 19 and the phase-signal detector 20, since the radiation path between them is chopped by the same chopper wheel 42 that governs the operation of the detector 13. If the bulb 19 and detector 20 are appropriately positioned, the phase of the A.-C. signal generated at the output of the detector 20 by the chopper wheel can be made substantially identical to that of the A.C. signal appearing at the output of detector 13. Any suitable provision, either mechanical or electronic, can be made for fine adjustment of the phase of the reference signal from detector 20, so as to make it precisely the correct value for operation of the phase rectifier 17. A suitable mechanical adjustment may take the form of a bolt and lock-nut arrangement permitting adjustment within a limited range of the position of detector 20 relative to the chopper wheel 42 in the circumferential direction. An equivalent electronic adjustment means may consist of any of the familiar adjustable phaseshifting networks, which may be incorporated at any suitable point in the signal channel in amplifier 21 or amplifier 22.

The A.-C. signal from detector 13 is amplified to a convenient level by elements 14, 15, and 16, and it is then rectified by the phase-sensitive rectifier 17, producing a D.-C. output voltage of one polarity if the phase of the signal from detector 13 is identical to that of the signal from detector 20, and producing a D.-C. output voltage of opposite polarity if the phases are opposed.

The D.C. voltage from phase-sensitive rectifier 17 is then applied to the servo mechanism described in connection with Fig. 8, and the voltage applied to the filament of bulb 51 is accordingly increased or decreased so as to obtain from the filament of bulb 51 a radiant-energy output of the correct magnitude to balance the photon flux striking detector 13 from the target.

So long as this condition of balance exists, the A.-C. voltage output of detector 13 will be zero, and the voltage across the filament of bulb 51 will provide an accurate indication of the temperature of the target object. Any change in target temperature will result in a readjustment of the voltage applied to the filament of bulb 51, resulting in a new condition of balance, and the new voltage on the filament of bulb 51 will accurately indicate the new temperature of the target.

The speed with which balance can be achieved following a change in target temperature is phenomenally great, by prior-art standards. Typical embodiments of our invention exhibit a time constant of one second or less, as contrasted with typical time constants of several minutes in prior-art equipment.

The temperature-indicating means 29 may be any desired type of voltage-responsive device. A simple D.-C. voltmeter having a visually readable scale may be used, in which event the scale may be calibrated directly in terms of target temperature. If continuous recording of temperature data is required, the voltage across the filament of bulb 51 may be continuously recorded on a conventional laboratory strip recorder, again with appropriate calibration in terms of target temperature if desired.

While we have in this specification described the use of a detector 13 of the type which responds to photon flux, equivalent results can be obtained by the use of any other type of infra-red detector. If the device used as detector 13 is of the energy-responsive type, such as a thermistor or a thermocouple, the operation of our pyrometer will be essentially the same, assuming that conventional circuit changes are made to accommodate the electrical characteristics of the particular infra-red detector selected. If a detector other than a photon-flux responsive detector is used, however, the relationship between target temperature and null-source bulb voltage will be different from that in the embodiment described, and probably will not be as nearly linear in character.

Similarly, it is not essential that the incandescent filament used as a local radiation source be a tungsten filament. We may use any type of infra-red radiation generator which has low thermal inertia and which will produce radiation within the pass-band of the detector. We prefer to use a filament of tungsten or metal of similar properties, however, because of the linear response characteristics obtained thereby and also because tungsten-filament bulbs are cheap, easy to obtain, and exhibit extraordinary radiation stability over long periods of use.

A type of bulb eminently suitable for use as the local radiation source 51 is a conventional tungsten-filament incandescent bulb of the kind used in automobile lights.

Our use of rectified and filtered H.-F. current as a heating means for the filament of bulb 51 is a refinement which is not essential. The advantage of employing such current to heat the filament of bulb 51 is that a readily controllable direct current is thereby obtained which is entirely free from modulation components at frequencies that might introduce error into the readings. With appropriate safeguards against introduction of unwanted modulation, any type of current source can be used to heat the filament of bulb 51.

Similarly, our use of rectified and filtered high-frequency current to heat the filament of phase-reference bulb 19 is a non-essential refinement. The absolute intensity of the radiation from bulb 19 is not important, and the filament of that bulb can be heated from any source, provided unwanted modulation components in the current are avoided.

The temperature at which the filter plate 57 is held during pyrometer operation should normally be the lowest value that will definitely remain above the ambient temperature during operation of the instrument. Persons skilled in the art will realize that the temperature of filter plate 57 inherently sets the lower limit of target temperature at which a null can be achieved with our pyrometer.

As persons skilled in the pyrometer art will realize, the target temperature indicated by our pyrometer is essentially independent of target distance, so long as the radiation from the target illuminates the entire area of detector 13. This characteristic, however, is also possessed by some prior-art pyrometers and does not of itself constitute a novel feature of our invention.

The foregoing description of the structure and operation of a typical embodiment of our invention has brought out the fact that the filter plate 57 performs an important part in making possible accurate observations of the temperature of a target object whose temperature is changing rapidly. Since the NESA-coated filter plate herein described as illustrative of filter 57 is by no means the only filter suitable for the purpose, it is appropriate that we here discuss more fully the properties which a suitable filter 57 should have.

The filament of an incandescent bulb, such as bulb 51, is normally hot enough during operation to have an emission spectrum which includes a substantial component of radiation at wavelengths less than 3 microns. The glass normally used for the envelopes of such bulbs is essentially transparent to radiation at wavelengths under about 3 microns, and is increasingly opaque to radiation of longer wavelengths, the proportion of energy absorbed being greater with increasing wavelength.

Infra-red energy absorbed by the bulb envelope of course raises its temperature, the envelope thereby becoming a secondary source of infra-red radiation. This re-radiation, however, is normally in the long-wavelength region and contains little energy at wavelengths shorter than 3 microns.

Since the glass envelope has large thermal inertia compared to the filament, we desire to prevent the secondary radiation from the envelope from reaching the detector 13, in order that the system may possess the shortest possible time constant. The function of filter plate 57 is to suppress this envelope radiation.

Any device may be used as filter 57 which will effectively pass a substantial fraction of the radiant energy from the filament while suppressing substantially all the radiant energy emitted by the bulb envelope that would otherwise reach the detector. The NESA-coated glass filter described in this specification accomplishes this result very well, since its own cut-off wavelength is about 3 microns. A filter material with an even shorter cut-off wavelength than 3 microns can be used successfully, although the use of such material would result in needlessly cutting down the proportion of the filament radiation that reaches the detector 13. Similarly, a material can be used for filter 57 that cuts off at a longer wavelength than 3 microns, so long as its cut-off characteristic is such that it is substantially opaque to the radiation from the glass envelope of bulb 51.

The selection, therefore, of a suitable material for filter 57 will depend upon the spectrum of the infra-red radiation from the glass envelope of the null-source bulb. A filter material should be selected which is substantially opaque to all such radiation, and this can be achieved by choosing a filter material which has a cut-off wavelength at least slightly shorter than the cut-off wavelength of the material of which the bulb envelope is made, since the envelope will not radiate infra-red energy at wavelengths to which it is transparent.

We have heretofore alluded only briefly to calibration of our pyrometer. If the instrument is to be used exclusively for observation of target objects which have black-body characteristics, a permanent temperature calibration of the indicating device 29 can easily be achieved, merely by use of a standard target which can be adjusted to a plurality of known temperatures within the range for which calibration is desired. When the instrument is used, however, on targets which do not possess the characteristics of a black body, re-calibration of the instrument for the particular target to be observed will be desirable, if accurate numerical temperature readings are needed.

Once calibrated for a given application, our pyrometer possesses extraordinary stability. None of the electronic circuits are critical, so that there is no risk of error arising from aging of vacuum tubes or other circuit components. The only element in the system wherein long-range stability is essential to accurate results is the bulb 51 used as the null source, and we have found standard production bulbs of the type described to be extraordinarily stable in their characteristics over many months of continuous operation.

The principles of our invention can be successfully employed in arrangements wherein two radiation detectors are used, one of which is continuously illuminated by the target object and the other of which is continuously illuminated by the null source. Pyrometers of this kind are well known in the prior art. Normally, such arrangements either employ electronic switching, as a means of comparing the null-source radiation and target radiation, or have the two radiation detectors arranged in a suitable circuit, such as a bridge, to provide continuous comparison of the D.-C. output signals from the respective detectors. In either case, the radiation intensity of the null source is adjusted to achieve a balance with the radiation from the target.

It will be apparent to skilled readers that a bulb having a low-mass incandescent filament can be used as a null source in such apparatus, and, if employed in combination with a suitable filter, as taught herein, rapid response to changes in target temperature can be achieved.

The principal disadvantage of such two-detector pyrometers is that they require accurate matching of detector characteristics and involve electronic circuits requiring critical adjustment. It is primarily for that reason that we prefer the arrangement herein described, using only a single infra-red detector and a mechanical chopper.

The illustrated embodiment of our invention, both in its structural and its electrical aspects, is intended merely to be illustrative and representative of our invention. Persons skilled in the art will be able to make many changes therein and departures therefrom without departing from the spirit of our invention. It is therefore our desire that the scope of our invention be determined primarily with reference to the appended claims.

We claim:

1. A pyrometer comprising, in combination, means for detecting infra-red radiation, means for illuminating said detector means with infra-red radiation from an object whose temperature is to be measured, a local source of infra-red radiation comprising an envelope and a filament therein heatable to infra-red radiating temperature by the passage of electric current therethrough, said envelope having the property of passing a component of the radiation from said filament and absorbing and re-radiating another component thereof, means for illuminating said detector means with radiation from said local source, means for sensing the difference in response of said detector means to said respective radiations and operative to develop a signal representative of such difference, means for supplying electrical current to said filament, means responsive to said signal operative to control said current-supply means and to regulate the current through said filament to maintain the radiation from said filament at a value whereat its effect on said detector means bears a predetermined relation to the effect thereon of the radiation from said object, calibrated indicating means responsive to the electrical potential drop across said filament for indicating the temperature of said object, and filter means, interposed in the radiation path between said local source and said detector means operative to filter out of the radiation impinging on said detector means the component re-radiated from said envelope.

2. A pyrometer comprising, in combination, means for detecting infra-red radiation, means for illuminating said detector means with infra-red radiation from an object whose temperature is to be measured, a local source of infra-red radiation comprising a glass envelope and a metallic incandescent filament therein heatable to infra-red radiating temperature by the passage of electric current therethrough, said glass envelope having the property of passing a component of the radiation from said filament and absorbing and re-radiating another component thereof, means for illuminating said detector means with radiation from said local source, means for sensing the difference in response of said detector means to said respective radiations and operative to develop a signal representative of such difference, means for supplying electrical current to said filament, means responsive to said signal operative to control said current-supply means and to regulate the current through said filament to maintain the radiation therefrom at a value whereat its effect on said detector means bears a predetermined relation to the effect thereon of the radiation from said object, calibrated indicating means responsive to the electrical potential drop across said filament for indicating the temperature of said object, and filter means interposed in the radiation path between said local source and said detector means operative to filter out of the radiation impinging on said detector means the component re-radiated from said envelope.

3. A pyrometer having, in combination, infra-red detecting means comprising at least one intermetallic crystal responsive proportionately to the photon flux impinging thereon throughout a substantial portion of the infra-red spectrum, means for illuminating said detector means with infra-red radiation from an object whose temperature is to be measured, a local source of infra-red radiation comprising a glass envelope and a tungsten filament therein, said filament being heatable to infra-red radiating temperature by the passage of electric current therethrough, said envelope having the property of passing a component of the infra-red radiation from said filament and absorbing and re-radiating another component thereof, means for illuminating said detector means with radiation from said local source, means for sensing the difference in response of said detector means to said respective radiations and operative to develop a signal representative of such difference, means for supplying electrical current to said filament, means responsive to said signal operative to control said current-supply means and to regulate the current through said filament to maintain the radiation therefrom at a value whereat its effect on said detector means bears a predetermined relation to the effect thereon of the radiation from said object, calibrated indicating means responsive to the electrical potential drop across said filament for indicating the temperature of said object, and filter means interposed in the radiation path between said local source and said detector means operative to filter out of the radiation impinging on said detector means the component re-radiated from said envelope.

4. A pyrometer having, in combination, infra-red detecting means comprising at least one intermetallic crystal responsive proportionately to the photon flux impinging thereon throughout a substantial portion of the infra-red spectrum, means for illuminating said detector means with infra-red radiation from an object whose temperature is to be measured, a local source of infra-red radiation comprising a glass envelope and a tungsten filament therein, said filament being heatable to infra-red radiating temperature by the passage of electric current therethrough, said envelope having the property of passing a component of the infra-red radiation from said filament and absorbing and re-radiating another component thereof, means for illuminating said detector means with radiation from said local source, means for sensing the difference in response of said detector means to said respective radiations and operative to develop a signal representative of such difference, means for supplying electrical current to said filament, means responsive to said signal operative to control said current-supply means and to regulate the current through said filament to maintain the radiation therefrom at a value whereat its effect on said detector means bears a predetermined relation to the effect thereon of radiation from said object, calibrated indicating means responsive to the electrical potential drop across said filament for indicating the temperature of said object, filter means interposed in the radiation path between said local source and said detector means operative to filter out of the radiation impinging on said detector means the component re-radiated from said envelope, means for heating said filter means to a predetermined temperature above the ambient temperature of the space surrounding said filter means, and means comprising a temperature-sensitive element for holding said filter means substantially at such predetermined temperature.

5. A pyrometer comprising, in combination, means for detecting infra-red radiation, means for illuminating said detector means with infra-red radiation from an object whose temperature is to be measured, a local source of infra-red radiation comprising an envelope and a filament therein heatable to infra-red radiating temperature by the passage of electric current therethrough, said envelope having the property of passing a component of the radiation from said filament and absorbing and re-radiating another component thereof, means for illuminating said detector means with radiation from said local source, means for sensing the difference in response of said detector means to said respective radiations and operative to develop a signal representative of such difference, means for supplying electrical current to said filament, means responsive to said signal operative to control said current-supply means and to regulate the current through said filament to maintain the radiation from said filament at a value whereat its effect on said detector means bears a predetermined relation to the effect thereon of the radiation from said object, calibrated indicating means responsive to the electrical potential drop across said filament for indicating the temperature of said object, filter means interposed in the radiation path between said local source and said detector means operative to filter out of the radiation impinging on said detector means the component re-radiated from said envelope, means for heating said filter means to a predetermined temperature above the ambient temperature of the space surrounding said filter means, and means comprising a temperature-sensitive element for maintaining said filter means substantially at such predetermined temperature.

6. A pyrometer comprising, in combination, means for detecting infra-red radiation, means for illuminating said detector means with infra-red radiation from an object whose temperature is to be measured, a local source of infra-red radiation comprising a glass envelope and a metallic incandescent filament therein heatable to infra-red radiating temperature by the passage of electric current therethrough, said envelope having the property of passing a component of the radiation from said filament and absorbing and re-radiating another component thereof, means for illuminating said detector means with radiation from said local source, means for sensing the difference in response of said detector means to said respective radiations and operative to develop a signal representative of such difference, means for supplying electrical current to said filament, means responsive to said signal operative to control said current-supply means and to regulate the current through said filament to maintain the radiation therefrom at a value whereat its effect on said detector means bears a predetermined relation to the effect thereon of the radiation from said object, calibrated indicating means responsive to the electrical potential drop across said filament for indicating the temperature of said object, filter means interposed in the radiation path between said local source and said detector means operative to filter out of the radiation impinging on said detector means the component re-radiated from said envelope, means for heating said filter means to a predetermined temperature above the ambient temperature of the space surrounding said filter means, and means comprising a temperature-sensitive element for maintaining said filter means substantially at such predetermined temperature.

7. In a pyrometer of the null-seeking type having an infra-red detector means, means for directing thereon infra-red radiation from an object whose temperature is to be measured, a local source of radiant energy comprising an envelope and an incandescent filament therein, said envelope being substantially transparent to infra-red radiation from said filament of wavelength less than a characteristic cut-off wavelength, said envelope also absorbing and re-radiating at wavelengths longer than said cut-off wavelength a part of the radiant energy from said filament, means for directing radiation from said local source onto said detector means, and means for comparing the relative response of said detector means to radiation from said object and radiation from said local source, the improvement which comprises a filter means interposed in the radiation path between said local source and said detector means having the characteristic of transmitting infra-red radiation of wavelength less than a predetermined wavelength and absorbing substantially all infra-red radiation of longer wavelength impinging on it, said predetermined wavelength being a wavelength to which said envelope is substantially transparent.

8. In a pyrometer of the null-seeking type having an infra-red detector means, means for directing thereon infra-red radiation from an object whose temperature is to be measured, a local source of radiant energy comprising an envelope and an incandescent filament therein, said envelope being substantially transparent to infra-red radiation from said filament of wavelength less than a characteristic cut-off wavelength, said envelope also absorbing and re-radiating at wavelengths longer than said cut-off wavelength a part of the radiant energy from said filament, means for directing radiation from said local source onto said detector means, and means for comparing the relative response of said detector means to radiation from said object and radiation from said local source, the improvement which comprises a filter means interposed in the radiation path between said local source and said detector means having the characteristic of transmitting infra-red radiation of wavelength less than a predetermined wavelength and absorbing substantially all infra-red radiation of longer wavelength impinging on it, said filter being operative to transmit a substantial part of the infra-red radiation from said filament and to absorb substantially all of said re-radiated longer-wavelength energy impinging on it.

9. In a pyrometer of the null-seeking type having an infra-red detector means, means for directing thereon infra-red radiation from an object whose temperature is to be measured, a local source of radiant energy comprising an envelope and an incandescent filament therein, said envelope being substantially transparent to infra-red radiation from said filament of wavelength less than a characteristic cut-off wavelength, said envelope also absorbing and re-radiating at wavelengths longer than said cut-off wavelength a part of the radiant energy from said filament, means for directing radiation from said local source onto said detector means, and means for comparing the relative response of said detector means to radiation from said object and radiation from said local source, the improvement which comprises a filter means interposed in the radiation path between said local source and said detector means having the characteristic of transmitting infra-red radiation of wavelength less than a predetermined wavelength and absorbing substantially all infra-red radiation of longer wavelength impinging on it, said predetermined wavelength being in the neighborhood of said characteristic cut-off wavelength of said envelope.

10. In a pyrometer of the null-seeking type having an infra-red detector means, means for directing thereon infra-red radiation from an object whose temperature is to be measured, a local source of radiant energy comprising an envelope and an incandescent filament therein, said envelope being substantially transparent to infra-red radiation from said filament of wavelength less than a characteristic cut-off wavelength, said envelope also absorbing and re-radiating at wavelengths longer than said cut-off wavelength a part of the radiant energy from said filament, means for directing radiation from said local source onto said detector means, and means for comparing the relative response of said detector means to radiation from said object and radiation from said local source, the improvement which comprises a filter means interposed in the radiation path between said local source and said detector means having the characteristic of transmitting infra-red radiation of wavelength less than a predetermined wavelength and absorbing substantially all infra-red radiation of longer wavelength impinging on it, said predetermined wavelength lying between said characteristic cut-off wavelength of said envelope and the wavelength of the spectral peak of the filament radiation transmitted by said envelope.

11. In a pyrometer of the null-seeking type having an infra-red detector means, means for directing thereon infra-red radiation from an object whose temperature is to be measured, a local source of radiant energy comprising an envelope and an incandescent filament therein, said envelope being substantially transparent to infra-red radiation from said filament of wavelength less than a characteristic cut-off wavelength, said envelope also absorbing and re-radiating at wavelengths longer than said cut-off wavelength a part of the radiant energy from said filament, means for directing radiation from said local source onto said detector means, and means for comparing the relative response of said detector means to radiation from said object and radiation from said local source, the improvement which comprises, in combination, a filter means interposed in the radiation path between said local source and said detector means, means for heating said filter means to a predetermined temperature above the ambient temperature of the space surrounding it, and means comprising a temperature-sensitive element for maintaining said filter means substantially at said predetermined temperature, said filter means having the characteristic of transmitting infra-red radiation of wavelength less than a predetermined wavelength and absorbing substantially all infra-red radiation of longer wavelength impinging on it, said predetermined wavelength being a wavelength to which said envelope is substantially transparent.

12. In a pyrometer of the null-seeking type having an infra-red detector means, means for directing thereon infra-red radiation from an object whose temperature is to be measured, a local source of radiant energy comprising an envelope and an incandescent filament therein, said envelope being substantially transparent to infra-red radiation from said filament of wavelength less than a characteristic cut-off wavelength, said envelope also absorbing and re-radiating at wavelengths longer than said cut-off wavelength a part of the radiant energy from said filament, means for directing radiation from said local source onto said detector means, and means for comparing the relative response of said detector means to radiation from said object and radiation from said local source, the improvement which comprises, in combination, a filter means interposed in the radiation path between said local source and said detector means, means for heating said filter means to a predetermined temperature above the ambient temperature of the space surrounding it, and means comprising a temperature-sensitive element for maintaining said filter means substantially at said predetermined temperature, said filter means having the characteristic of transmitting infra-red radiation of wavelength less than a predetermined wavelength and absorbing substantially all infra-red radiation of longer wavelength impinging on it, said filter being operative to transmit a substantial part of the infra-red radiation from said filament and to absorb substantially all of said re-radiated longer-wavelength energy impinging on it.

13. In a pyrometer of the null-seeking type having an infra-red detector means, means for directing thereon infra-red radiation from an object whose temperature is to be measured, a local source of radiant energy comprising an envelope and an incandescent filament therein, said envelope being substantially transparent to infra-red radiation from said filament of wavelength less than a characteristic cut-off wavelength, said envelope also absorbing and re-radiating at wavelengths longer than said cut-off wavelength a part of the radiant energy from said filament, means for directing radiation from said local source onto said detector means, and means for comparing the relative response of said detector means to radiation from said object and radiation from said local source, the improvement which comprises, in combination, a filter means interposed in the radiation path between said local source and said detector means, means for heating said filter means to a predetermined temperature above the ambient temperature of the space surrounding it, and means comprising a temperature-sensitive element for maintaining said filter means substantially at said predetermined temperature, said filter means having the characteristic of transmitting infra-red radiation of wavelength less than a predetermined wavelength and absorbing substantially all infra-red radiation of longer wavelength impinging on it, said predetermined wavelength being in the neighborhood of said characteristic cut-off wavelength of said envelope.

14. In a pyrometer of the null-seeking type having an infra-red detector means, means for directing thereon infra-red radiation from an object whose temperature is to be measured, a local source of radiant energy comprising an envelope and an incandescent filament therein, said envelope being substantially transparent to infra-red radiation from said filament of wavelength less than a characteristic cut-off wavelength, said envelope also absorbing and re-radiating at wavelengths longer than said cut-off wavelength a part of the radiant energy from said filament, means for directing radiation from said local source onto said detector means, and means for comparing the relative response of said detector means to radiation from said object and radiation from said local source, the improvement which comprises, in combination, a filter means interposed in the radiation path between said local source and said detector means, means for heating said filter means to a predetermined temperature above the ambient temperature of the space surrounding it, and means comprising a temperature-sensitive element for maintaining said filter means substantially at said predetermined temperature, said filter means having the characteristic of transmitting infra-red radiation of wavelength less than a predetermined wavelength and absorbing substantially all infra-red radiation of longer wavelength impinging on it, said predetermined wavelength lying between said characteristic cut-off wavelength of said envelope and the wavelength of the spectral peak of the filament radiation transmitted by said envelope.

15. A pyrometer having, in combination, means for detecting infra-red radiation comprising an intermetallic crystal proportionately responsive to the photon flux impinging on it over a substantial part of the infra-red spectrum, means for directing toward said detector means infra-red radiation from an object whose temperature is to be measured, a local source of infra-red radiation comprising an incandescent bulb having a tungsten filament therein and a glass envelope and being heatable to infra-red radiating temperature by the passage of electric current through said filament, said glass bulb having the property of passing the major portion of infra-red radiation from said filament below a characteristic wavelength and absorbing the major portion of infra-red radiation from said filament at longer wavelengths, said glass bulb being operative on absorbing such energy to re-radiate a part of the same at wavelengths longer than said characteristic wavelength, means for directing infra-red radiation from said local source toward said detector means, means for alternately illuminating said detector means with radiation from said object and radiation from said local source, means for sensing the difference in response of said detector means to said respective radiations and operative to develop a signal representative of such difference, means for supplying electrical current to the filament of said bulb, means responsive to said signal operative to control said current-supply means and to regulate the current through said filament to maintain the radiation therefrom at a level whereat its effect on said detector is substantially equal to the effect thereon of the radiation from said object, calibrated indicating means responsive to the electrical potential drop across said filament for indicating the temperature of said object, a glass filter plate interposed in the radiation path between said local source and said detector means, means for heating said filter plate to a temperature above the ambient temperature of the space surrounding it, and means comprising a temperature-sensitive element for maintaining said filter plate substantially at such predetermined temperature, said filter plate being made of a glass having a characteristic cut-off wavelength to infra-red radiation shorter than said characteristic wavelength of said glass envelope.

References Cited in the file of this patent
UNITED STATES PATENTS

| | | |
|---|---|---|
| 1,716,775 | Hayes | June 11, 1929 |
| 2,677,277 | Machler | May 4, 1954 |
| 2,761,072 | Wormser | Aug. 28, 1956 |
| 2,886,970 | Munker | May 19, 1959 |